United States Patent
Qiu et al.

(10) Patent No.: US 8,460,848 B2
(45) Date of Patent: Jun. 11, 2013

(54) SOLVENT-FREE BIO-BASED EMULSION

(75) Inventors: Shigang Qiu, Toronto (CA); Santiago Faucher, Oakville (CA); Fumii Higuchi, Mississauga (CA); Guerino G. Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 12/967,370

(22) Filed: Dec. 14, 2010

(65) Prior Publication Data
US 2012/0148951 A1 Jun. 14, 2012

(51) Int. Cl.
*G03G 5/00* (2006.01)

(52) U.S. Cl.
USPC .................................. 430/137.14; 430/109.4

(58) Field of Classification Search
USPC .......................................... 430/137.14, 109.4
See application file for complete search history.

(56) References Cited

U.S. PATENT DOCUMENTS

| | | |
|---|---|---|
| 3,590,000 A | 6/1971 | Palermiti et al. |
| 4,298,672 A | 11/1981 | Lu |
| 4,338,390 A | 7/1982 | Lu |
| 5,278,020 A | 1/1994 | Grushkin et al. |
| 5,290,654 A | 3/1994 | Sacripante et al. |
| 5,302,486 A | 4/1994 | Patel et al. |
| 5,308,734 A | 5/1994 | Sacripante et al. |
| 5,344,738 A | 9/1994 | Kmiecik-Lawrynowicz et al. |
| 5,853,943 A | 12/1998 | Cheng et al. |
| 5,959,066 A | 9/1999 | Charbonneau et al. |
| 6,025,061 A | 2/2000 | Khanarian et al. |
| 6,063,464 A | 5/2000 | Charbonneau et al. |
| 6,107,447 A | 8/2000 | Kreuder et al. |
| 6,214,507 B1 | 4/2001 | Sokol et al. |
| 6,593,049 B1 | 7/2003 | Veregin et al. |
| 6,743,559 B2 | 6/2004 | Combes et al. |
| 6,756,176 B2 | 6/2004 | Stegamat et al. |
| 6,830,860 B2 | 12/2004 | Sacripante et al. |
| 7,029,817 B2 | 4/2006 | Robinson et al. |
| 7,329,476 B2 | 2/2008 | Sacripante et al. |
| 8,338,069 B2 * | 12/2012 | Andaya et al. ........... 430/137.14 |
| 2006/0216626 A1 | 9/2006 | Sacripante et al. |
| 2006/0222991 A1 | 10/2006 | Sacripante et al. |
| 2007/0015075 A1 | 1/2007 | Vijayendran et al. |
| 2008/0107989 A1 | 5/2008 | Sacripante et al. |
| 2008/0107990 A1 | 5/2008 | Field et al. |
| 2008/0145775 A1 | 6/2008 | Vijayendran et al. |
| 2008/0153027 A1 | 6/2008 | Veregin et al. |
| 2008/0236446 A1 | 10/2008 | Zhou et al. |
| 2009/0047593 A1 | 2/2009 | Vanbesien et al. |
| 2009/0208864 A1 | 8/2009 | Zhou et al. |
| 2009/0246680 A1 | 10/2009 | Chung et al. |
| 2010/0099037 A1 | 4/2010 | McAneney-Lannen et al. |

* cited by examiner

*Primary Examiner* — Mark A Chapman
(74) *Attorney, Agent, or Firm* — Eugene O. Palazzo (57) ABSTRACT

Solvent-free extrusion processes are disclosed that are suitable for forming high bio-based polyester latexes that may be utilized in forming a toner, as well as other commercial products.

11 Claims, 3 Drawing Sheets

SOLVENT-FREE BIO-BASED EMULSION

TECHNICAL FIELD

The present disclosure relates to processes for producing resin emulsions useful in producing toners. More specifically, solvent-free processes are provided for the production of bio-based polyester resins utilizing extruders.

BACKGROUND

Numerous processes are within the purview of those skilled in the art for the preparation of toners. Emulsion aggregation (EA) is one such method. Emulsion aggregation toners may be used in forming electrophotographic images. Emulsion aggregation techniques may involve the formation of a polymer emulsion by heating a monomer and undertaking batch or semi-continuous emulsion polymerization, as disclosed in, for example, U.S. Pat. No. 5,853,943, the disclosure of which is hereby incorporated by reference in its entirety. Emulsion aggregation/coalescing processes for the preparation of toners are illustrated in a number of patents, such as U.S. Pat. Nos. 5,290,654, 5,278,020, 5,308,734, 5,344,738, 6,593,049, 6,743,559, 6,756,176, 6,830,860, 7,029,817, and 7,329,476, and U.S. Patent Application Publication Nos. 2006/0216626, 2008/0107989, 2008/0107990, 2008/0236446, and 2009/0047593. The disclosures of each of the foregoing patents are hereby incorporated by reference in their entirety.

Polyester EA ultra low melt (ULM) toners have been prepared utilizing amorphous and crystalline polyester resins as illustrated, for example, in U.S. Patent Application Publication No. 2008/153027, the disclosure of which is hereby incorporated by reference in its entirety.

The incorporation of these polyesters into the toner requires that they first be formulated into emulsions prepared by solvent containing batch processes, for example solvent flash emulsification and/or solvent-based phase inversion emulsification (PIE), which are both time and energy-consuming. In both cases, large amounts of organic solvents, such as ethyl acetate, ketones or alcohols, have been used to dissolve the resins, which may require subsequent energy intensive distillation to form the latexes, and are not environmentally friendly.

Solventless latex emulsions have been formed in either a batch or extrusion process through the addition of a neutralizing solution, a surfactant solution and water to a thermally softened resin as illustrated, for example, in U.S. Patent Application Publications Serial Nos. 2009/0246680 and 2009/0208864, the disclosures of each of which are hereby incorporated by reference in their entirety.

Improved processes for the preparation of polymer latexes suitable for use in a toner remain desirable.

SUMMARY

The present disclosure provides processes for producing toners, and toners produced thereby. In embodiments, a process of the present disclosure includes contacting at least one bio-based amorphous polyester resin with an optional plasticizer to form a pre-blend mixture; neutralizing the pre-blend mixture with a neutralizing agent; contacting the pre-blend mixture with a surfactant; melt-mixing the pre-blend mixture; contacting the melt-mixed mixture with de-ionized water to form an oil in water emulsion possessing a latex; and recovering the latex.

In other embodiments, a process of the present disclosure includes contacting at least one bio-based amorphous polyester resin derived at least in part from a material such as natural triglyceride vegetable oils, phenolic plant oils, and combinations thereof, with an optional plasticizer in a first section of an extruder to form a resin mixture; neutralizing the resin mixture in a second section of the extruder with a neutralizing agent such as ammonium hydroxide, potassium hydroxide, sodium hydroxide, sodium carbonate, sodium bicarbonate, lithium hydroxide, potassium carbonate, potassium bicarbonate, piperazine, tris-hydroxymethyl-aminomethane, and combinations thereof; contacting the resin mixture with a surfactant in the extruder; melt-mixing the resin mixture in the extruder; contacting the melt-mixed mixture with de-ionized water to form an oil in water emulsion possessing a latex in the extruder; and recovering the latex from the extruder.

In yet other embodiments, a process of the present disclosure includes contacting at least one bio-based polyester resin including components such as a fatty dimer diol, a fatty dimer diacid, D-isosorbide, L-tyrosine, glutamic acid, and combinations thereof, with an optional crystalline resin and an optional plasticizer in an extruder to form a resin mixture; neutralizing the resin mixture in the extruder with a neutralizing agent; contacting the resin mixture in the extruder with a surfactant; melt-mixing the resin mixture in the extruder; contacting the melt-mixed mixture with de-ionized water in the extruder to form an oil in water emulsion possessing a latex; recovering the latex from the extruder; contacting the latex with an optional crystalline resin, an optional colorant, and an optional wax to form a second mixture; aggregating the mixture to form particles; adjusting the pH of the mixture to from about 3 to about 10 to stop growth of the particles; coalescing the particles at a pH from about 5 to about 8 to form toner particles; and recovering the toner particles.

BRIEF DESCRIPTION OF DRAWINGS

Various embodiments of the present disclosure will be described herein below with reference to the figures wherein.

DETAILED DESCRIPTION

To make an EA toner, conventional processes using bio-based resins include first converting the resin into an aqueous dispersion (latex). However the bio-resin is only soluble in toxic organic solvents, such as dichloromethane, and can only be emulsified via a solvent flash process with the use of surfactant as a stabilizer at lab scale. However, the solvent flash emulsification process utilizes a 10 to 1 ratio of solvent to resin, with a low batch yield of less than 15% solid content. In the solvent removal process, a large amount of solvent needs to be evaporated at the end of the emulsification, which takes a long time to complete. Furthermore, the use of toxic organic solvent is an environmental concern, and the solvent process may not be applied at a production scale.

The present disclosure provides a new formulation and process for the emulsification of bio-based resins to form nano-scale particles dispersed in water (latex) without the use of organic solvents by an extrusion process. Bio-based products, as used herein, in embodiments, include commercial and/or industrial products (other than food or feed) that may be composed, in whole or in significant part, of biological products or renewable domestic agricultural materials (including plant, animal, or marine materials) and/or forestry materials as defined by the U.S. Office of the Federal Environmental Executive.

As noted above, the latex of the present disclosure and the process for its production are solvent free and, therefore, there are no traces of solvent present in the latex, as none are used for their production. The resulting emulsion may then be used for forming a toner, paint, powder, coating, compounding additive for pharmaceuticals, encapsulant for a drug, adhesive, or food additive. In embodiments, the process for producing the emulsion may be a continuous process.

In embodiments, a process of the present disclosure, which emulsifies a bio-resin into latex, includes the following: blending the bio-resin with a surfactant (such as sodium dodecylbenzene sulfonate (SDBS), sodium lauryl sulfate (SLS), or combinations thereof, and a neutralizer such as sodium hydroxide (NaOH), piperazine, or combinations thereof, to form a mixture; melt mixing the above mixture in an extruder; emulsifying the melt mixture by injecting de-ionized water into the extruder; and diluting the mixture with de-ionized water.

The desired properties of the bio-emulsion (particle size and solids content) can be achieved by adjusting the concentration of the surfactant and neutralizer. The quality of the emulsion can be affected by process parameters such as extruder speed, material feed rate, extruder temperature profile, and injection nozzle position.

The process of the present disclosure may be continuous, thereby enhancing the efficiency of the process.

Resins

Any resin may be utilized in forming a latex emulsion of the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and the like, including their structural isomers. The aliphatic diol may be, for example, utilized in an amount of from about 40 to about 60 mole percent, in embodiments from about 42 to about 55 mole percent, in embodiments from about 45 to about 53 mole percent, and a second diol can be utilized in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be utilized in an amount of, for example, in embodiments from about 40 to about 60 mole percent, in embodiments from about 42 to about 52 mole percent, in embodiments from about 45 to about 50 mole percent, and a second diacid can be utilized in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 50 percent by weight of the toner components, in embodiments from about 5 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Polycondensation catalysts which may be utilized in forming the crystalline polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

Suitable crystalline resins which may be utilized, optionally in combination with an amorphous resin as described below, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

wherein b is from about 5 to about 2000 and d is from about 5 to about 2000. In embodiments, a suitable crystalline resin may include a resin formed from dodecanedioic acid and 1,9-nonanediol monomers.

In embodiments, resins utilized in accordance with the present disclosure may also include bio-based amorphous resins. As used herein, a bio-based resin is a resin or resin formulation derived from a biological source such as vegetable oil instead of petrochemicals. As renewable polymers with low environmental impact, their principal advantages are that they reduce reliance on finite resources of petrochemicals; they sequester carbon from the atmosphere. A bio-resin includes, in embodiments, for example, a resin wherein at least a portion of the resin is derived from a natural biological material, such as animal, plant, combinations thereof, and the like. In embodiments, at least a portion of the resin may be derived from materials such as natural triglyceride vegetable oils (e.g. rapeseed oil, soybean oil, sunflower oil) or phenolic plant oils such as cashew nut shell liquid (CNSL), combinations thereof, and the like. Suitable bio-based amorphous resins include polyesters, polyamides, polyimides, polyisobutyrates, and polyolefins, combinations thereof, and the like. In some embodiments, the bio-based resins are also biodegradable.

Examples of amorphous bio-based polymeric resins which may be utilized include polyesters derived from monomers including a fatty dimer diacid or diol of soya oil, D-isosorbide, and/or amino acids such as L-tyrosine and glutamic acid as described in U.S. Pat. Nos. 5,959,066, 6,025,061, 6,063,464, and 6,107,447, and U.S. Patent Application Publication Nos. 2008/0145775 and 2007/0015075, the disclosures of each of which are hereby incorporated by reference in their entirety. Combinations of the foregoing may be utilized, in embodiments. Suitable amorphous bio-based resins include those commercially available from Advanced Image Resources, under the trade name BIOREZ™ 13062, BIOREZ™ 15062, and BIOREZ™ AIR-64-116. In embodiments, a suitable amorphous bio-based polymeric resin which may be utilized may include a dimer diacid of soya oil, isosorbide (which may be obtained from corn starch), with the remainder of the amorphous bio-based polymeric resin being 1,4-cyclohexane dicarboxylic acid (CHDA) and/or dimethyl terephthalate (DMT). In embodiments the bio-based polymeric resin may include isosorbide and 1,4-cyclohexane dicarboxylic acid.

In embodiments, a suitable amorphous bio-based resin may have a glass transition temperature of from about 45° C. to about 70° C., in embodiments from about 50° C. to about 65° C., a weight average molecular weight (Mw) of from about 2,000 to about 200,000, in embodiments of from about 5,000 to about 100,000, a number average molecular weight (Mn) as measured by gel permeation chromatography (GPC) of from about 1,000 to about 10,000, in embodiments from about 2,000 to about 8,000, a molecular weight distribution (Mw/Mn) of from about 2 to about 20, in embodiments from about 3 to about 15, and a viscosity at about 130° C. of from about 10 Pa*S to about 100000 Pa*S, in embodiments from about 50 Pa*S to about 10000 Pa*S.

The amorphous bio-based resin may be present, for example, in amounts of from about 1 to about 95 percent by weight of the toner components, in embodiments from about 5 to about 50 percent by weight of the toner components, although the amount of the amorphous bio-based resin can be outside of these ranges.

In embodiments, the amorphous bio-based polyester resin may have a particle size of from about 50 nm to about 500 nm in diameter, in embodiments from about 75 nm to 300 nm in diameter.

In embodiments, suitable latex resin particles may include one or more of the crystalline resins described above, and one or more amorphous bio-based resins, such as a BIOREZ™ resin described herein.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 4% (first resin)/96% (second resin) to about 96% (first resin)/4% (second resin), although weight ratios outside these ranges may be utilized. Where the core resin includes a crystalline resin, a bio-based amorphous resin, and another amorphous resin, the weight ratio of the three resins may be from about 98% (amorphous resin):1% (crystalline resin):1% (bio-based amorphous resin), to about 0% (amorphous resin):15% (crystalline resin):85% (bio-based amorphous resin).

In embodiments, the resin may be formed by condensation polymerization methods. In other embodiments, the resin may be formed by emulsion polymerization methods.

Plasticizer

In embodiments, a plasticizer may be added to the resins described above. The plasticizer may be used to soften the resin to a viscosity suitable for passage through an extruder. The softened resin may be sufficiently viscous so as to not be free-flowing at room temperature, but sufficiently pliable to be mixed by the extruder. The complex viscosity of the softened resin, sometimes referred to herein, in embodiments, as a pre-blend mixture, may be from about 10 Pa*S to about 1,000 Pa*S at about 130° C., in embodiments, from about 50 Pa*S to about 500 Pa*S. The complex viscosity of the resin pre-blend mixture can be measured using any suitable rheometer. For example, a 25 mm sample disc can be prepared by molding about 0.5 grams of pre-blend mixture under a pressure of about 10,000 lbs and the complex viscosity response at various temperature and shear rates can be determined using a parallel plate rheometer such as a Rheometric Scientific Corporation Model ARES.

In embodiments, waxes may be used as plasticizers for softening the resin. The wax may be provided in a wax dispersion, which may include a single type of wax or a mixture of two or more different waxes. When included, the wax may be present in an amount of, for example, from about 1% by weight to about 25% by weight of the resin, in embodiments from about 5% by weight to about 20% by weight of the resin.

Waxes that may be utilized include waxes having, for example, a weight average molecular weight of from about 500 to about 20,000, in embodiments from about 1,000 to about 10,000. Suitable plasticizer waxes include ester waxes obtained from higher fatty acid and higher alcohol, such as stearyl stearate and behenyl behenate; ester waxes obtained from higher fatty acid and monovalent or multivalent lower alcohols, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Other suitable plasticizer waxes include functionalized waxes having amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated and amide waxes, such as aliphatic polar amide functionalized waxes; aliphatic waxes including esters of hydroxylated unsaturated fatty acids, for example MICROSPERSION 19™ available from Micro Powder Inc., imides, esters, quaternary amines, carboxylic acids or acrylic polymer emulsions, for example JONCRYL 74™, 89™, 130™, 537™, and 538™, all available from SC Johnson Wax, and chlorinated polypropylenes and polyethylenes, available from Allied Chemical, Petrolite Corporation, and/or SC Johnson wax. Mixtures and combinations of the foregoing waxes may also be used in embodiments.

In embodiments, if the polyester resin is a bio-based amorphous resin, a crystalline polyester resin may be used as a plasticizer, which lowers the softening temperature of the amorphous resin such that, at temperatures near the boiling point of water, the viscosity of the melt mix is low enough to form an emulsion.

Neutralizing Agent

In embodiments, the resin may be pre-blended with a weak base or neutralizing agent. In embodiments the base may be contacted with the resin as a solid or in an aqueous solution. The resin and the neutralizing agent may be simultaneously fed through a co-feeding process, which may accurately control the feed rate of both the base and the resin into the extruder throughout the process, and which may then be melt-mixed followed by emulsification. Utilizing this process allows for control of the base concentration and a more efficient process. Co-feeding may allow for process repeatability and stability, and lower initial start-up waste.

In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, potassium bicarbonate, combinations thereof, and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring. Other basic agents used as a neutralizer include, for example, tris-hydroxymethyl-aminomethane.

The basic agent may be utilized as a solid such as, for example, sodium hydroxide flakes, so that it is present in an amount of from about 0.001% by weight to 50% by weight of the resin, in embodiments from about 0.01% by weight to about 25% by weight of the resin, in embodiments from about 0.1% by weight to 5% by weight of the resin.

As noted above, the basic neutralization agent may be added to a resin possessing acid groups. The addition of the basic neutralization agent may thus raise the pH of an emulsion including a resin possessing acid groups to a pH of from about 5 to about 12, in embodiments, from about 6 to about 11. The neutralization of the acid groups may, in embodiments, enhance formation of the emulsion.

Surfactants

In embodiments, the process of the present disclosure may include adding a surfactant, before or during the melt-mixing, to the resin at an elevated temperature. In embodiments, a solid surfactant may be co-fed with the resin and the neutralizing agent into the extruder. In embodiments, a solid surfactant may be added to the resin and the neutralizing agent to form a pre-blend mixture prior to melt-mixing. Where utilized, a resin emulsion may include one, two, or more surfactants. The surfactants may be selected from ionic surfactants and nonionic surfactants. Anionic surfactants and cationic surfactants are encompassed by the term "ionic surfactants."

In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in embodiments, from about 1% to about 14% by weight of the resin.

Anionic surfactants which may be utilized include sulfates and sulfonates, sodium dodecylsulfate (SDS), sodium dodecylbenzene sulfonate (SDBS), sodium lauryl sulfate (SLS), sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates (SDBS). Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA210™, IGEPAL CA-520™, IGEPAL CA720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Resin Mixture Processing

As noted above, the present process includes melt-mixing a mixture in an extruder at an elevated temperature containing a bio-based resin, an optional plasticizer, a solid or aqueous surfactant, and a neutralizing agent. The elevated temperature may be from about 30° C. to about 200° C., in embodiments from about 50° C. to about 150° C., in embodiments from about 70° C. to about 100° C. In embodiments, the process of the present disclosure may be continuous.

Figure 1:
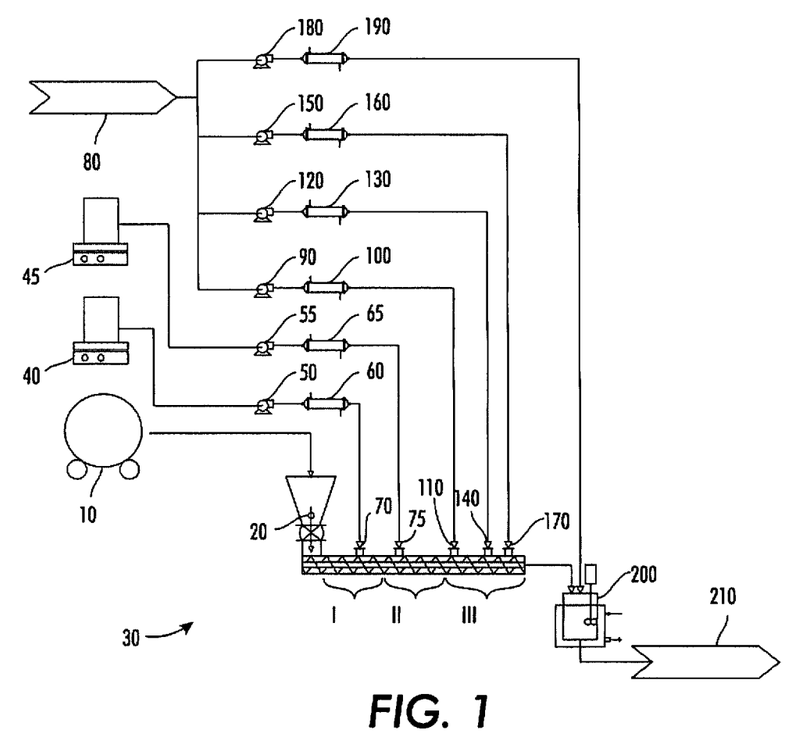
FIG. 1 is a schematic diagram of an extruder for preparation of a bio-based resin latex according to embodiments of the present disclosure.

Turning to FIG. 1, melt-mixing of the resin may be conducted in an extruder 30, which may be a twin screw extruder, a kneader such as a Haake mixer, a batch reactor, or any other device capable of intimately mixing viscous materials to create near homogenous mixtures. Stirring, although not necessary, may be utilized to enhance formation of the latex. Any suitable stirring device may be utilized. In embodiments, the stirring may be at from about 10 revolutions per minute (rpm) to about 5,000 rpm, in embodiments from about 20 rpm to about 2,000 rpm, in embodiments from about 50 rpm to about 1,000 rpm. The stirring need not be at a constant speed and may be varied. For example, as the heating of the mixture becomes more uniform, the stirring rate may be increased.

More than one resin may be utilized in forming the latex. As noted above, the resin may be a bio-based amorphous resin, a crystalline resin, or a combination thereof. In embodiments, the resin may be an amorphous resin and the elevated temperature may be a temperature above the glass transition temperature of the amorphous resin. In embodiments, the resin may be a crystalline resin and the elevated temperature may be a temperature above the melting point of the crystalline resin. In further embodiments, the resin may be a mixture of amorphous and crystalline resins and the temperature may be above the glass transition temperature of the mixture.

In embodiments, the resin, the plasticizer and the neutralizing agent may be pre-blended prior to melt-mixing. In embodiments, the resin and the plasticizer may be mixed in a tumbler 10 for from about 10 minutes to about 60 minutes, in embodiments from about 15 minutes to about 30 minutes, at a rotor speed of from about 1 rotation per minute (rpm) to about 20 rpm, in embodiments from about 5 rpm to about 15 rpm, to prepare a pre-blend mixture.

The pre-blend resin mixture is fed through a screw feeder 20 coupled to the extruder 30. The pre-blend resin mixture may be co-fed into the extruder 30 with a neutralizing agent in solid form, such as flakes or pellets being fed through a separate feeder (not shown). If the neutralizing agent is used in an aqueous solution, the dissolved neutralizing agent may be pre-mixed with the surfactant and water in a vessel 45 and co-fed through pump 55 to extruder injection port 75 or fed separately to injection port 75. The neutralizing agent may be fed at a rate such that it is at a concentration of about 0.2% by weight to about 5% by weight of the resin, in embodiments, from about 0.4% by weight to about 2% by weight of the resin. Concentration of the components is provided rather than the rates to achieve the desired composition, since flow and feed rates vary with the scale of the processing equipment (e.g., extruder 30).

In embodiments, a solid surfactant may be utilized and co-fed with the resin into the extruder feed hopper. The surfactant may be added to the resin composition before, during, or after melt-mixing and before, during, or after the addition of the neutralizing agent. Alternatively, the surfactant may be in an aqueous solution. More specifically, as the pre-blend resin mixture travels down the extruder 30, a solution of the surfactant may be fed into the extruder's injection port 75, from the vessel 45 via the diaphragm pump 55 and heated via heat exchanger 65. If a solid neutralizing agent is utilized, the water in the surfactant solution activates the neutralizing agent while the surfactant is melt-mixed with the resin to produce a homogeneous mixture of a neutralized resin. The surfactant is fed at a rate such that it is at a concentration of from about 0.5% by weight to about 20% by weight of the resin, in embodiments, from about 2% by weight to about 15% by weight of the resin.

In embodiments, a plasticizer may be injected directly into the extruder 30 to blend the resin and the plasticizer within the extruder 30, thus eliminating the need for pre-blending. The plasticizer may be fed through an extruder injection port 70, from a vessel 40 via a diaphragm pump 50 and heated via heat exchanger 60. The plasticizer may be injected at a rate such that it is at a concentration of about 1% by weight to about 100% by weight of the resin, in embodiments, from about 10% by weight to about 50% by weight of the resin. The injection port 70 may be disposed at a first section I of the extruder 30, which acts as a melting zone, prior to the injection port 75, which supplies the surfactant solution. The injection port 75 may be disposed at a second section II subsequent to the first section, such that the surfactant is added to the mixture after the plasticizer has been mixed with the resin in the extruder 30. In embodiments, the injection ports 70 and 75 may be disposed at the same section, e.g., first section, in the extruder 30 such that the plasticizer and surfactant are fed simultaneously.

Emulsion Formation

Once the resin, plasticizer, neutralizing agent and surfactant are melt-mixed, the resulting dispersion mixture may be contacted with water to form an oil in water latex emulsion. For example, de-ionized water (DIW) may be added to form a latex with a solids content of from about 5% to about 50%, in embodiments, of from about 10% to about 40%. In embodiments, water temperatures may be from about 20° C. to about 110° C., in embodiments, from about 60° C. to about 100° C.

Contact between the water and the resin mixture may be achieved via water injection ports into the extruder. As shown in FIG. 1, as the melt-mixed resin mixture travels down the extruder 30, pre-heated, DIW may be added at three subsequent ports 110, 140, and 170 at section III of the extruder 30. DIW may be stored in a tank 80 and be fed to the extruder's injection ports 110, 140, and 170 via diaphragm pumps 90, 120, and 150. The DIW is heated via heat exchangers 100, 130, and 160, respectively.

Addition of water is advantageous so that the formation of an oil in water emulsion may be gradual, ensuring that the materials continue to mix rather than phase separate, and to optimize emulsion formation in the extruder. In embodiments, the ports may inject preheated de-ionized water into the extruder at rates of from about 1 g/min to about 400 g/min, in embodiments, of from about 5 g/min to about 200 g/min, such that the final solids content of the latex is from about 10% to about 40%, in embodiments, from about 15% to about 35%.

The product exiting from the extruder may include a stream of latex that is collected in a steam traced tank 200 with gentle agitation with additional DIW fed from tank 80 to achieve the desired final product solids content, via diaphragm pump 180 and heated via heat exchanger 190. Once a desired latex is achieved, the latex is discharged as a latex stream 210 for storage and later use in the aggregation/coalescence process described below.

The particle size of the latex emulsion formed can be controlled by the concentration ratio of plasticizer, surfactant and/or neutralizing agent to polyester resin. The solids concentration of the latex may be controlled by the ratio of the resin mixture to water.

In accordance with the present disclosure, it has been found that the processes herein may produce emulsified bio-based resin particles.

The emulsified resin particles in the aqueous medium may have a size of about 1500 nm or less, such as from about 10 nm to about 1200 nm, in embodiments from about 30 nm to about 1,000 nm. Particle size distribution of a latex of the present disclosure may be from about 60 nm to about 300 nm, in embodiments, from about 125 nm to about 250 nm. The coarse content of the latex of the present disclosure may be from about 0% by weight to about 1% by weight, in embodiments, from about 0.1% by weight to about 0.5% by weight. The solids content of the latex of the present disclosure may be from about 5% by weight to about 75% by weight, in embodiments, from about 30% by weight to about 50% by weight.

Following emulsification, additional surfactant, water, and/or neutralizing agent may optionally be added to dilute the emulsion, although this is not required. Following emulsification, the emulsion may be cooled to room temperature, for example from about 20° C. to about 25° C.

Various benefits may be obtained utilizing the processes of the present disclosure. For example, the process, formulation, and material disclosed herein: is a solvent free latex derived from a bio-based resin with no traces of solvent; creates a new class of bio based emulsions with a wide range of applications in the marking material field as well as in many coatings, food, pharmaceutical applications (paints, films, food products, drug packaging) where bio-based and solvent free latexes are desired; is produced in an environmentally and commercially attractive (cost effective) and scaleable process; and is the only known method of creating a latex in an environmentally friendly way from certain bio-based resins.

In embodiments, the latex emulsions of the present disclosure may be utilized to produce toners.

Toner

Once the resin mixture has been contacted with water to form an emulsion as described above, the resulting bio-based resin latex may then be utilized to form a toner by any method within the purview of those skilled in the art. The bio-based latex emulsion may be contacted with a colorant, optionally in a dispersion, and other additives to form an ultra low melt toner by a suitable process, in embodiments, an emulsion aggregation and coalescence process.

In embodiments, the optional additional ingredients of a toner composition, including additional resins, such as crystalline resins, colorant, wax, and other additives, may also be added before, during or after melt-mixing the resin to form the latex emulsion of the present disclosure. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. The colorant may be added in amounts from about 0.1 to about 35 weight percent of the toner, in embodiments from about 1 to about 15 weight percent of the toner, in embodiments from about 3 to about 10 weight percent of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in embodiments, from about 5% by weight to about 25% by weight.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be of from about 100 nm to about 300 nm, in embodiments from about 125 nm to about 275 nm.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titanates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Shell Resin

In embodiments, after aggregation, but prior to coalescence, a resin coating may be applied to the aggregated particles to form a shell thereover. Any resin described above may be utilized as the shell. In embodiments, a bio-based polyester amorphous resin latex as described above may be included in the shell. In yet embodiments, the polyester amorphous resin latex described above may be combined with a different resin, and then added to the particles as a resin coating to form a shell.

Multiple resins may be utilized in any suitable amounts. In embodiments, a first amorphous polyester resin, for example a bio-based amorphous resin described above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins, may be combined with the aggregated particles described above so that the shell forms over the aggregated particles.

The formation of the shell over the aggregated particles may occur while heating to a temperature of from about 30°

C. to about 80° C., in embodiments from about 35° C. to about 70° C. The formation of the shell may take place for a period of time of from about 5 minutes to about 10 hours, in embodiments from about 10 minutes to about 5 hours.

Coalescence

Following aggregation to the desired particle size and application of any optional shell, the particles may then be coalesced to the desired final shape, the coalescence being achieved by, for example, heating the mixture to a temperature of from about 45° C. to about 100° C., in embodiments from about 55° C. to about 99° C., which may be at or above the glass transition temperature of the resins utilized to form the toner particles, and/or reducing the stirring, for example to from about 100 rpm to about 1,000 rpm, in embodiments from about 200 rpm to about 800 rpm. Coalescence may occur at a pH of from about 5 to about 8, in embodiments from about 6 to about 7. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, triboelectric enhancement, admix control, improved development and transfer stability, and higher toner blocking temperature. $TiO_2$ may be applied for improved relative humidity (RH) stability, triboelectric control and improved development and transfer stability. Zinc stearate, calcium stearate and/or magnesium stearate may optionally also be used as an external additive for providing lubricating properties, developer conductivity, triboelectric enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000 and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure.

EXAMPLES

Example 1

Emulsification of BIOREZ™ AIR-64-116 with sodium dodecylbenzene sulfonate (SDBS) and NaOH via extrusion process.

Figure 2:
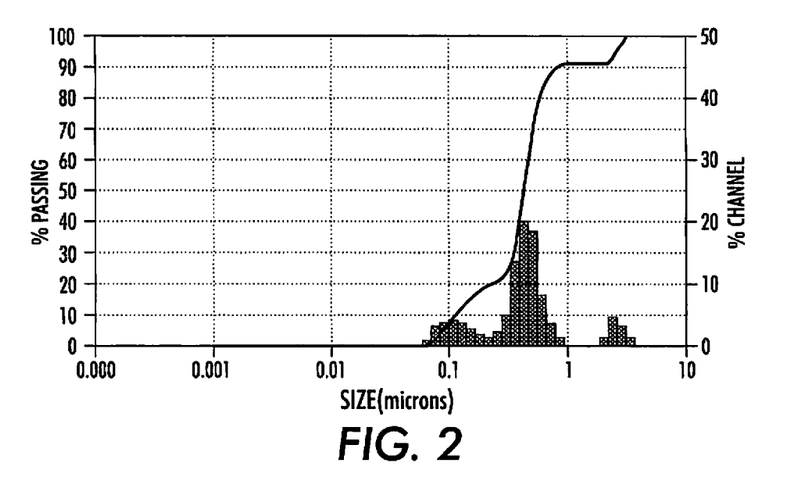
FIG. 2 is a graph showing the particle size distribution of an emulsion formed in Example 1 of the present disclosure.

About 88 grams of BIOREZ™ AIR-64-116 resin (commercially available from Advanced Image Resources), about 13.2 grams of SDBS, and about 1.76 grams of ground NaOH powder were measured into a 250 ml plastic beaker. The mixture was mixed with a spatula for about two minutes. This mixture was fed into an extruder (a Leistritz MICRO 18 extruder) at a rate of about 16.7 grams/minute. The extruder was operated at a screw speed of about 120 rpm and with a specified barrel temperature profile of (cooling/130° C./130° C./130° C./125° C./99° C./99° C./99° C./99° C.) over its 8 sections plus a die plate. As the material traveled down the screw and melted, pre-heated de-ionized water was injected into the extruder at rate of about 15 grams/minute at the sixth port. The product from the extruder included a stream of latex that was collected and diluted with a fixed amount of de-ionized water in a small beaker with gentle agitation. The particle size distribution for the latex produced is shown in FIG. 2.

Example 2

Figure 3:
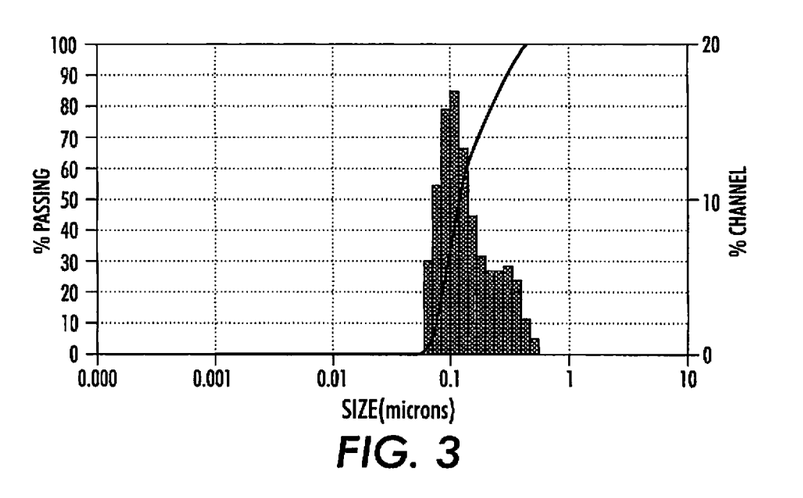
FIG. 3 is a graph showing the particle size distribution of an emulsion formed in Example 2 of the present disclosure.

Emulsification of BIOREZ™ AIR-64-116 with SDBS and piperazine via extrusion process About 120 grams of the BIOREZ™ AIR-64-116 resin described in Example 1 above, about 18 grams of SDBS, and about 2.4 grams of ground piperazine powder were measured into a 500 ml plastic beaker. The mixture was mixed with a spatula for about two minutes. This mixture was fed into the extruder described in Example 1 above at a rate of about 16.7 grams/minute. The extruder was operated at a screw speed of about 120 rpm and with a specified barrel temperature profile (cooling/130° C./140° C./140° C./140° C./99° C./99° C./99° C./99° C.) over its 8 sections plus a die plate. As the material traveled down the screw and melted, pre-heated de-ionized water was injected into the extruder at rate of about 15 grams/minute at the sixth port. The product from the extruder included a stream of latex that was collected and diluted with a fixed amount of deionized water in a small beaker with gentle agitation. The particle size distribution for the latex produced is shown in FIG. 3.

Example 3

Emulsification of BIOREZ™ AIR-64-116 with sodium lauryl sulfate (SLS) and NaOH via extrusion process.

Figure 4:
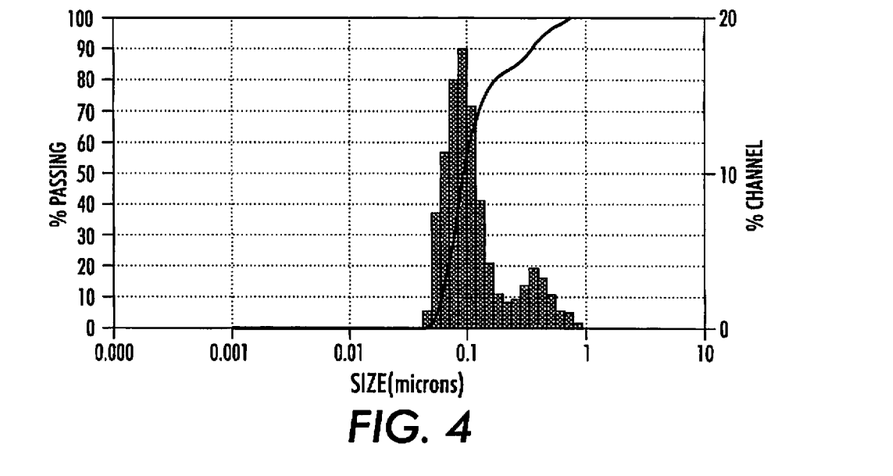
FIG. 4 is a graph showing the particle size distribution of an emulsion formed in Example 3 of the present disclosure.

About 120 grams of the BIOREZ™ AIR-64-116 resin described in Example 1, about 18 grams of SLS, and about 2.4 grams of ground NaOH powder were measured into a 500 ml plastic beaker. The mixture was mixed with a spatula for about two minutes. This mixture was fed into the extruder described in Example 1 at a rate of about 16.7 grams/minute. The extruder was operated at a screw speed of about 120 rpm and with a specified barrel temperature profile (cooling/130° C./140° C./140° C./135° C./109° C./109° C./109° C./109° C.) over its 8 sections plus a die plate. As the material traveled down the screw and melted, pre-heated de-ionized water was injected into the extruder at rate of about 15 grams/minute at the sixth port. The product from the extruder included a stream of latex that was collected and diluted with a fixed amount of deionized water in a small beaker with gentle agitation. The particle size distribution for the latex produced is shown in FIG. 4.

Example 4

Emulsification of BIOREZ™ AIR-64-116 with sodium lauryl sulfate (SLS) and piperazine via extrusion process.

Figure 5:
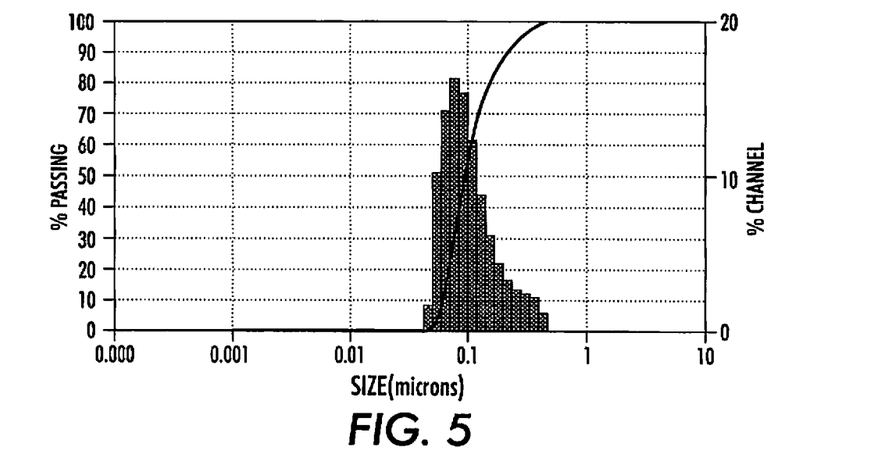
FIG. 5 is a graph showing the particle size distribution of an emulsion formed in Example 4 of the present disclosure.

About 240 grams of the BIOREZ™ AIR-64-116 resin described above in Example 1, about 36 grams of SLS, and about 4.8 grams of ground piperazine powder were measured into a 500 ml plastic beaker. The mixture was mixed with a spatula for about two minutes. This mixture was fed into the extruder described above in Example 1 at a rate of about 25 grams/minute. The extruder was operated at a screw speed of about 120 rpm and with a specified barrel temperature profile (cooling/130° C./140° C./140° C./135° C./99° C./99° C./99° C./99° C.) over its 8 sections plus a die plate. As the material traveled down the screw and melted, pre-heated de-ionized water was added at the third and sixth ports into the extruder at a rate of about 10 grams/minute and about 25 grams/minute, respectively. The product from the extruder included a stream of latex that was collected and diluted with a fixed amount of deionized water in a small beaker with gentle agitation. About 250 grams of emulsion was generated. The particle size distribution for the latex produced is shown in FIG. 5.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising: contacting at least on bio-based polyester resin including components selected from the group consisting of a fatty dimer diol, a fatty dimer diacid, D-isosorbide, L-tyrosine, glutamic acid, and combinations thereof, with an optional crystalline resin and an optional plasticizer in an extruder to form a resin mixture; neutralizing the resin mixture in the extruder with a neutralizing agent; contacting the resin mixture in the extruder with a surfactant; melt-mixing the resin mixture in the extruder; contacting the melt-mixed mixture with de-ionized water in the extruder to form an oil in water emulsion possessing a latex; recovering the latex from the extruder; contacting the latex with an optional crystalline resin, an optional colorant, and an optional wax to form a second mixture; aggregating the mixture to form particles; adjusting the pH of the mixture to from about 3 to about 10 to stop growth of the particles; coalescing the particles at a pH from about 5 to about 8 to form toner particles; and recovering the toner particles.

2. The process according to claim 1, wherein the amorphous bio-based polyester resin comprises isosorbide and 1,4-cyclohexane dicarboxylic acid.

3. The process according to claim 1, wherein the surfactant is selected from the group consisting of sodium dodecylsulfate, sodium dodecylbenzene sulfonate, sodium lauryl sulfate, sodium dodecylnaphthalene sulfate, dialkyl benzenealkyl sulfates, dialkyl benzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12 ammonium bromide, C15 trimethyl ammonium bromide, C17 trimethyl ammonium bromide, dodecylbenzyl triethyl ammonium chloride, cetyl pyridinium bromide, and combinations thereof, and wherein the surfactants is in an aqueous solution.

4. The process according to claim 1, wherein the de-ionized water is added so that the emulsion possesses a solid content of from about 10% to about 40%.

5. The process according to claim 1, wherein the neutralizing agent is selected from the group consisting of ammonium hydroxide, potassium hydroxide, sodium hydroxide, sodium carbonate, sodium bicarbonate, lithium hydroxide, potassium carbonate, piperazine, tris-hydroxymethyl-aminomethane, and combinations thereof, and raises the pH of the emulsion to from about 5 to about 12.

6. The process according to claim 1, wherein particles in the latex have a size of from about 60 nm to about 300 nm.

7. The process according to claim 1 wherein said optional crystalline resin is present and said optional crystalline resin is a polyester.

8. The process according to claim 1 wherein said optional colorant is present.

9. The process according to claim 1 wherein said optional wax is present.

10. The process according to claim 1 wherein said optional plasticizer is present.

11. The process according to claim 1 wherein said optional crystalline resin is present, said colorant is present, said wax is present and said plasticizer is present.

* * * * *